(12) United States Patent
McVicker

(10) Patent No.: US 6,309,076 B1
(45) Date of Patent: Oct. 30, 2001

(54) LIGHT BARRIER, SCREEN OR REFLECTOR

(76) Inventor: Richard E. McVicker, 6521 Orville La., Indianapolis, IN (US) 46237

( * ) Notice: Subject to any disclaimer, the term of this patent is extended or adjusted under 35 U.S.C. 154(b) by 0 days.

(21) Appl. No.: 08/365,710

(22) Filed: Dec. 29, 1994

(51) Int. Cl.⁷ .............................. G02B 27/00; B60J 3/00
(52) U.S. Cl. ..................... 359/601; 359/871; 160/238; 160/370.22; 296/97.8; 40/603
(58) Field of Search .................... 359/601, 602, 359/871; 160/23.1, 84.04, 24, 133, 238, 313, 317, 351, 370.22; 296/97.6, 97.7, 97.8; 40/603, 610, 593; 267/37.1, 37.2, 158, 159, 272; 446/486

(56) References Cited

U.S. PATENT DOCUMENTS

| | | | |
|---|---|---|---|
| 1,648,994 | * | 11/1927 | Pitman . |
| 2,826,523 | * | 3/1958 | Blaszkowski et al. . |
| 2,874,770 | * | 2/1959 | Rohr et al. . |
| 2,887,154 | * | 5/1959 | Morningstar et al. . |
| 4,428,412 | * | 1/1984 | Toro . |
| 4,758,042 | * | 7/1988 | Liu ....................................... 296/97.8 |
| 4,825,921 | * | 5/1989 | Rigter . |
| 4,932,711 | * | 6/1990 | Goebel ................................ 296/97.7 |
| 5,016,937 | * | 5/1991 | White .................................. 296/97.7 |
| 5,024,262 | * | 6/1991 | Huang . |
| 5,024,479 | * | 6/1991 | Bryngelson ......................... 296/97.7 |
| 5,067,541 | * | 11/1991 | Coslett ............................... 160/84.04 |
| 5,076,633 | * | 12/1991 | Hsu et al. . |
| 5,176,452 | * | 1/1993 | Stern .................................... 446/486 |
| 5,196,985 | * | 3/1993 | Ford et al. . |
| 5,267,599 | * | 12/1993 | Kim . |
| 5,362,119 | * | 11/1994 | Rosentratter ........................ 296/97.8 |
| 5,391,106 | * | 2/1995 | Lidert, Jr. ............................. 446/304 |

* cited by examiner

Primary Examiner—Ricky D. Shafer

(57) ABSTRACT

A sun barrier, sign, screen or reflector or combination thereof. The barrier may be used, for instance, for reducing the sun exposure to the interior of an automobile. The barrier includes a flexible, cloth-like panel and a barrier control element with the control element selectively positioning the panel to a generally planar condition or a coiled storage condition. The control element may be a coiled strip spring or constant force spring attached to one edge of the barrier panel.

3 Claims, 2 Drawing Sheets

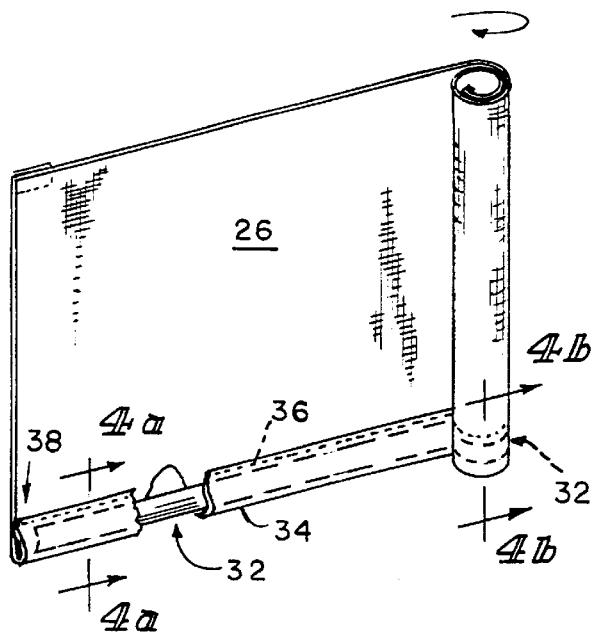
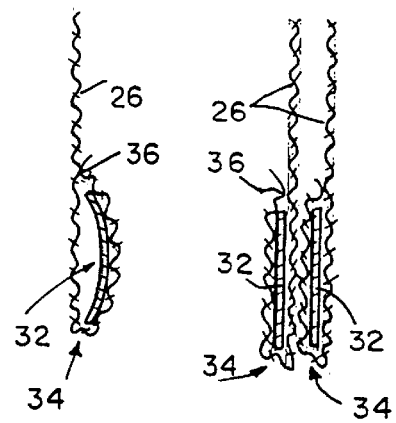
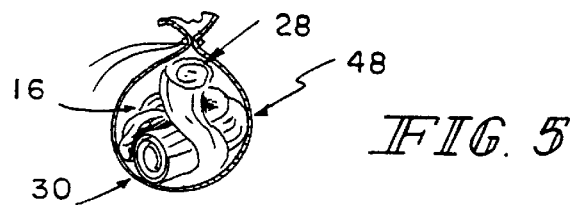
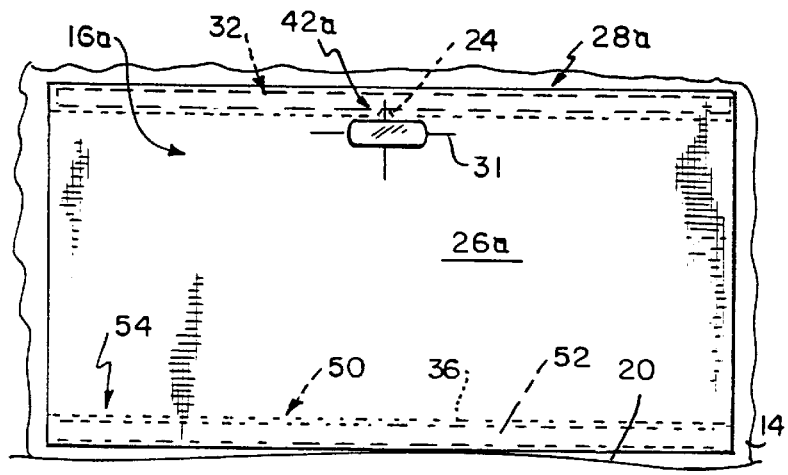

LIGHT BARRIER, SCREEN OR REFLECTOR

BACKGROUND AND SUMMARY OF INVENTION

The present invention relates to a sun barrier capable of being positioned in a flat planar condition or a coiled storage condition. More particularly, the invention relates to a device for use as a direct sun light barrier which may also act as a sign or as a collapsible sign and also as a movie screen or a photographer's reflector. In this description and in the claims, the word "barrier" is intended to cover a variety of products including a sunlight barrier, a sign or a combination barrier-sign, a screen, or a reflector. The barrier of the present invention may be used in automobiles or in any other environment where a barrier, sign, screen or reflector may be needed.

Present day automobiles are constructed from plastic and heat absorbing materials incorporated into the seat, side door panels, dashboard and steering wheel. Such plastic can be affected by heat or direct sunlight. To compound the problems associated with direct sunlight striking these plastic materials, the automobile manufacturers have increased the size of window area accessible to direct sunlight. A sun screen or barrier positioned between the interior side of the windshield and the sunlight affected materials has been found to be effective in reducing the heat and damage to the interior of the automobile.

One known method of providing such a barrier is an inexpensive corrugated cardboard barrier preformed into an accordion shape which can be extended and positioned between the windshield and the rear view mirror. This type of barrier can then be collapsed flat to store when not in use. One drawback to this cardboard device is that the barrier does not collapse small enough to be stored in the glove compartment. Also, if someone were to sit on or bend the cardboard device, it could be permanently damaged.

SUMMARY OF THE INVENTION

The present invention, therefore, is a barrier comprising a compliant panel of material capable of being deformed and collapsed into a generally compact form and then stretched or extended out from such compact form into a generally planar form to serve as a sun barrier, sign, screen or reflector or a combination thereof. The illustrative and preferred panel has lower, upper and side edges. A collapsible control means is attached to and extending along one edge of the panel to control the one edge. The term "attached" herein is used in a broad sense to include any arrangement where the control means floats in or is carried by the one edge to control the one edge. This control means has a collapsed or rolled-up condition which collapses or rolls up the one edge and an extended condition which extends the one edge into a rectilinear form. In accordance with the present invention, the control means may be a coiled, strip spring which, when collapsed, forms a cylinder, and, when extended, forms a rectilinear strip. This one edge of the panel may be provided with an elongated pocket extending therealong, and the spring may be disposed in the pocket to extend therealong when the spring is extended to hold the pocket and the one edge straight. The spring is captured in the pocket such that the one edge will follow the form of the spring and, consequently, coil up when the spring itself coils up. While the illustrative and preferred panel is rectangular or generally rectangular in shape, it will be appreciated that the panel may take a variety of shapes and that the control means may be disposed at a position other than along one edge.

The barrier of the present invention may also have an edge opposite to the one edge with the opposite edge formed with a second elongated pocket extending therealong. A second strip spring may be disposed in the second pocket to control the opposite edge in the same manner. In another embodiment, the panel may have an edge opposite to the said one edge, and the opposite edge may be formed with a second elongated pocket extending therealong. This second pocket may be filled with weight means such as sand to position the opposite edge away from the one edge including the control spring.

The barrier of the present invention may be constructed such that the one edge is the lower edge of the panel, the upper edge of which has opposite ends including means for attaching each of the opposite ends to a support, such as the internal surface of a windshield, thereby to suspend the panel in a generally planar form when the control means is extended.

The barrier of the present invention, therefore, comprises a cloth-like panel of material having upper, lower and side edges, the panel being collapsible into a compact form and extendible into a generally planar form. A collapsible, coiled strip spring is attached in some manner to one edge of the panel to extend therealong. This attachment between the spring and the said one edge of the panel is such that, as the spring is coiled, the panel will follow the spring to be coiled about the one edge. The one edge may be the lower edge of the panel, and the barrier may include means for attaching each of the opposite ends of the upper edge to a support such as the inside surface of a windshield.

One object of the present invention is to provide a collapsible, cloth-like sun barrier which can also provide a display for advertisements or personal statements to be displayed to the outside of the automobile when the barrier is positioned in a barrier position inside the automobile.

Accordingly, another aspect of the present invention is for the sun barrier to be collapsible to a size and shape small enough to be placed in the glove compartment or into a small bag which can be tucked under the seat or left on top of the front seat of the automobile.

Another object is for the sun barrier of the present invention to be made of a pliant, cloth-like or plastic-like material such that, if the material is deformed or compressed, it will not be damaged to the point of no longer working.

Yet another aspect of the barrier of the present invention is that it be made of a soft and compressible material that will permit it to conform to any shape container it might be stored in.

Still another object of the present invention is to provide a control associated with the barrier to produce a self-collapsing force from stored energy, provided by a coiled memory formed in the control, for accomplishing the compact storage condition of the barrier. The barrier, therefore, is a panel attached to a coiled strip spring to follow the spring. When the spring is coiled, the barrier is coiled. When the spring is straight, the panel adjacent the spring is straight.

Another object is to provide a means for anchoring the top of the sun barrier to the automobile and for allowing the bottom of the barrier to rest on the dashboard to provide a three point support means when the barrier is in the sun barrier position.

Accordingly another object is that the barrier be easily converted from a storage condition to a barrier condition by extending the barrier along its bottom edge to a straight condition by a smooth and simple movement by the operator.

Yet another object is for the barrier to be adaptable and convertible in its attached condition to the automobile such that it fits various makes and models of automobiles.

Additional objects, features and advantages of the invention will become apparent to those skilled in the art upon consideration of the following detailed description of embodiments exemplifying modes of carrying out the invention.

BRIEF DESCRIPTION OF THE DRAWINGS

The detailed description particularly refers to the accompanying Figures in which:

FIG. 3 is a perspective view of the barrier in a partial, self-collapsing condition;

FIGS. 4a and 4b are sectional views taken along lines 4a—4a and 4b—4b of FIG. 3;

FIG. 5 shows a transverse sectional view of a sack-like container with the barrier stored in the collapsed condition;

FIG. 6 is a modification of the present invention showing a control member located in the upper part of the barrier; and FIG. 7 depicts another modification of the barrier with control members positioned vertically on opposite sides to hold the barrier as a barrier, sign, screen or reflector or combination thereof.

DETAILED DESCRIPTION OF THE DRAWINGS

Figure 1:
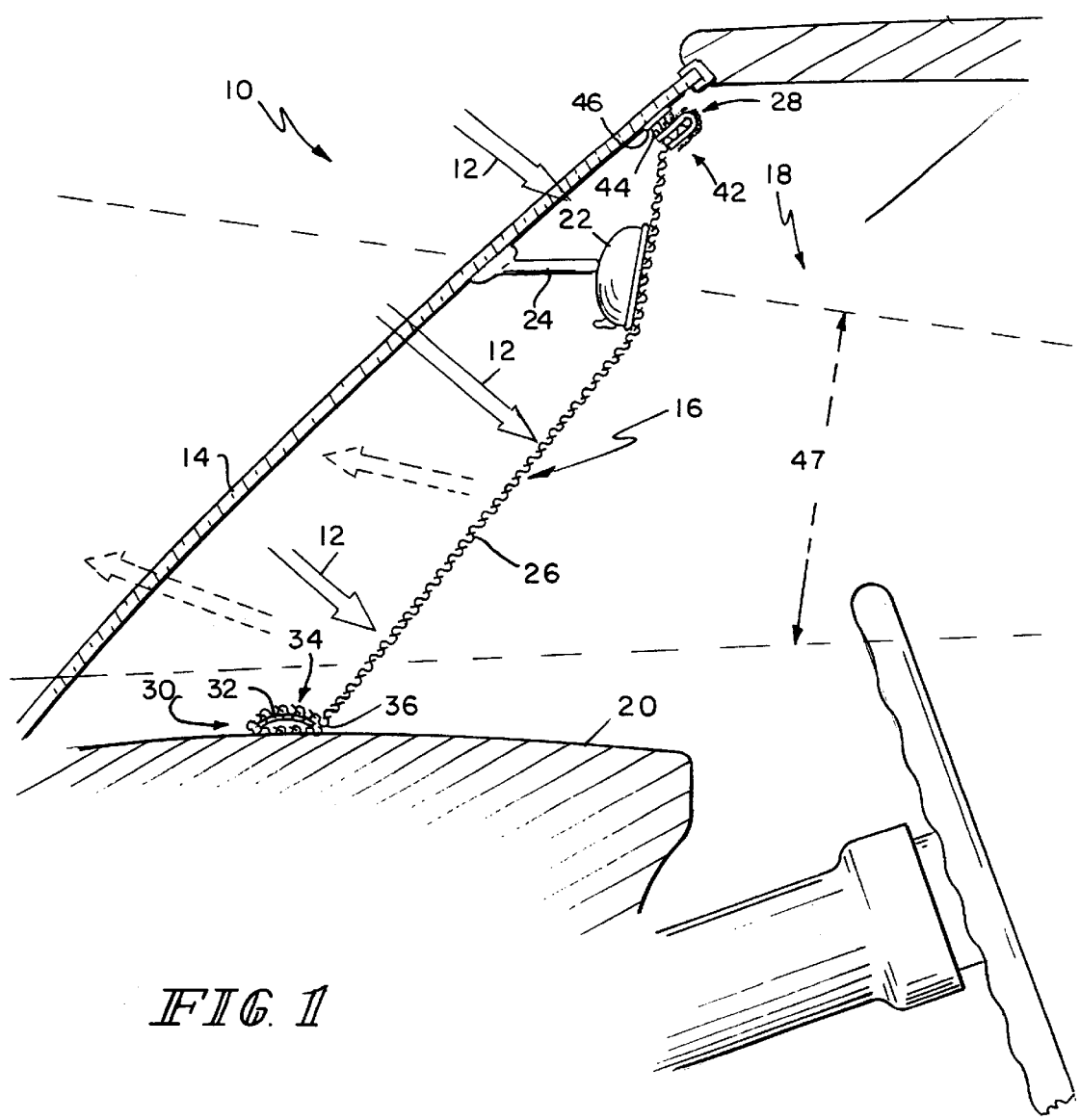
FIG. 1 is a sectional view through an automobile showing the barrier of the present invention positioned to provide a barrier between the sun rays and automobile interior.

As illustrated in FIG. 1, an automobile 10 is exposed to direct sunlight rays 12 passing through a windshield 14. A sun barrier 16 is shown positioned between the incoming sun rays 12 and heat affected interior 18, which may consist of plastic seats, steering wheel and dashboard 20. The automobile 10 is also conventionally equipped with a rear view mirror 22 supported on a post 24.

Figure 2:
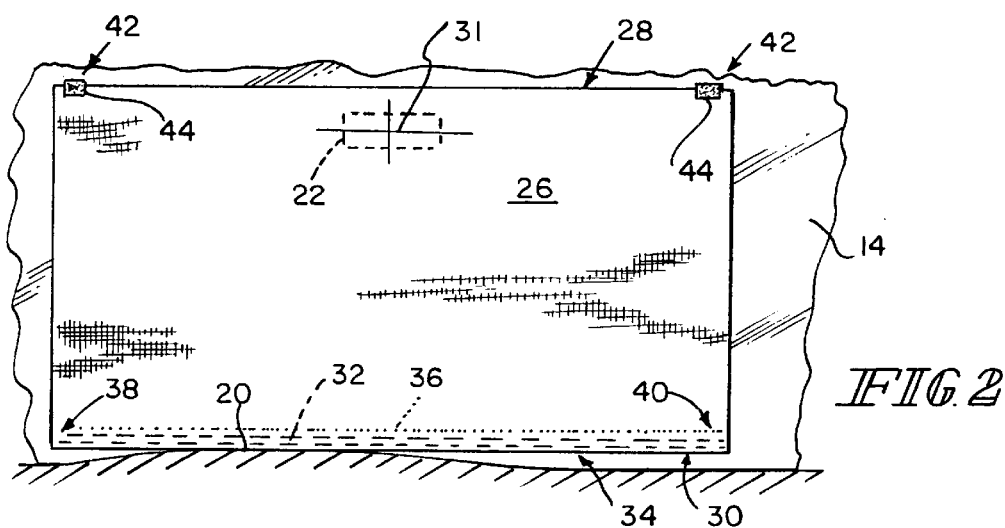
FIG. 2 illustrates an elevational view of the barrier in its extended condition.

In FIGS. 1 and 2, barrier 16 includes a flexible, pliant barrier material 26 in a substantially planar condition having an upper edge 28 and a lower edge 30. The barrier 16 may include an aperture 31 which could allow the mirror 22 to penetrate the barrier 16. The condition of the barrier 16 is dictated by a control means 32 which is retained near the lower edge 30 in an elongated pocket 34. Pocket 34 may be formed by folding the lower portion of material 26 upward and stitching at 36 to create the horizontal, elongated pocket 34. After control means 32 is positioned in the pocket 34, the ends 38 and 40 of pocket 34 are stitched to close pocket 34.

The control means 32 may be provided by a spring device known as a constant force spring or sometimes as a snap spring. This type of spring has a coiled memory and a transverse memory to the coiled memory so that, when the transverse memory is defeated by flattening, as shown in FIG. 4b, the spring takes on the shape of a coil, as illustrated on the right side of FIG. 3. Yet, when the spring is extended manually, by extending it out of its coiled memory to its full length and forced to its transverse memory, as illustrated in FIG. 4a, the spring takes on the shape of a straight flat strip as illustrated in the left side of FIG. 3. Quite often such springs, often referred to as NEGATOR® springs, are used as collapsible rulers for measuring distances up to a yard or more.

With the barrier 16 having its control means 32 in the extended condition as illustrated in FIG. 2, the barrier can be installed in an automobile 10 by way of attachment means 42 located in the uppermost corners of the barrier material 26. Attachment means 42 illustratively includes hook and loop fasteners with the loop portion 44 located on the material 26 in the uppermost corners and the hook portions 46 selectively positioned above sight line 47 and attached to windshield 14. The hook portions 46 may be positioned on the windshield by an adhesive and left in the selected position after the sun barrier is removed and stored. With the barrier 16 attached by attachment means 42, the lower edge 30 of material 26 will rest on at least one area of the dashboard 20 to provide a three point support means at the two attachment points 42 and the point at which edge 30 rests on dashboard 20. It can be seen in FIG. 1 that the point at which edge 30 contacts dashboard 20 is forward of attachment means 42 to thereby position the sun barrier 16 substantially parallel with windshield 14.

To remove the sun barrier from the barrier position as illustrated in FIG. 1 to a coiled or storage condition as illustrated in FIG. 5, the sun barrier 16 is detached from the attachment means 42 in the upper corners of material 26 and lifted off the dashboard 20. The control means 32 is then flattened at either end of its length and the control means will coil up as illustrated in the right-hand portion of FIG. 3 in response to the coil memory in the control means 32. Because the control means 32 is trapped in the pocket 34 of the barrier material 26, the barrier material will be coiled in a collapsed condition when the spring is coiled.

After the barrier material 26 and control means 32 are in a coiled condition, the material 26 can be further folded to yet a smaller size to fit into a glove compartment of the automobile 10 or placed in a draw-string bag 48 as illustrated in FIG. 5.

Another modification of the present invention is illustrated in FIG. 6 in which a control means 32 is located in the upper edge 28a of the barrier material 26a similar to that of FIG. 2 and a second pocket 50 contains a material or weight means such as sand 52 or the like to provide a weight 54 to rest on the dashboard 20 or to hold the sun barrier 16a in an extended condition. The second pocket 50 may also hold a second coiled spring for controlling the lower edge of the barrier. With this modification, the upper edge 28a could be positioned over the post 24 of the automobile 10 with the post 24 becoming the attachment means 42a.

FIG. 7 illustrates another modification of the present invention in which the material 56 may be of a stiffer material such as plastic or paper and include two control means 32 on the vertical side edges 58 of the material 56 for use as barrier, sign or such. Although the material 56 is shown as being supported by suction cups 60, it should be noted that various types of support means may be used.

All of the embodiments provide a device which is easy to transform from generally planar condition to a coiled condition without the assistance or aid of a second operator or special tools.

Although the invention has been described with reference to certain embodiments, variations and modifications exist within the scope and spirit of the invention as described and defined in the following claims.

What is claimed is:

1. A barrier comprising a compliant panel of material capable of being deformed and collapsed into a generally compact form and then stretched out from such compact form into a generally planar form to serve as a sun barrier, sign, screen or reflector or combination thereof, said panel having lower, upper, and side edges, and a collapsible control means attached to and extending along one edge of said panel to control said one edge, said control means having a collapsed condition which collapses said one edge and an extended condition which extends said one edge and wherein said control means is a coiled, strip spring which, when collapsed, forms a cylinder, and, when extended, forms a rectilinear strip and wherein said one edge of said panel is provided with an elongated pocket extending therealong and in which said spring is disposed in said pocket to extend therealong when said spring is extended to hold said pocket and said one edge straight, said spring being captured in said pocket such that said one edge will follow the form of said spring.

2. The barrier of claim 1 in which said panel has an edge opposite to said one edge formed with a second elongated pocket extending therealong, and including a second strip spring disposed in said second pocket to control said opposite edge.

3. The barrier of claim 1 in which said panel has an edge opposite to said one edge formed with a second elongated pocket extending therealong, and including weight means disposed in said second pocket to position said opposite edge away from said one edge.

* * * * *